United States Patent
Niu et al.

(10) Patent No.: US 12,021,590 B2
(45) Date of Patent: Jun. 25, 2024

(54) RECEIVER ASSISTED ACCESS MECHANISM IN THE NEW RADIO UNLICENSED SPECTRUM

(71) Applicant: Apple Inc., Cupertino, CA (US)

(72) Inventors: Huaning Niu, San Jose, CA (US); Chunxuan Ye, San Diego, CA (US); Dawei Zhang, Saratoga, CA (US); Haitong Sun, Cupertino, CA (US); Hong He, San Jose, CA (US); Oghenekome Oteri, San Diego, CA (US); Seyed Ali Akbar Fakoorian, San Diego, CA (US); Sigen Ye, Whitehouse Station, NJ (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 328 days.

(21) Appl. No.: 17/438,503

(22) PCT Filed: Aug. 4, 2021

(86) PCT No.: PCT/CN2021/110445
§ 371 (c)(1),
(2) Date: Sep. 13, 2021

(87) PCT Pub. No.: WO2023/010308
PCT Pub. Date: Feb. 9, 2023

(65) Prior Publication Data
US 2023/0299826 A1    Sep. 21, 2023

(51) Int. Cl.
*H04B 7/06* (2006.01)
*H04B 17/318* (2015.01)

(52) U.S. Cl.
CPC ......... *H04B 7/0626* (2013.01); *H04B 17/328* (2023.05)

(58) Field of Classification Search
None
See application file for complete search history.

(56) References Cited

U.S. PATENT DOCUMENTS

2015/0036612 A1    2/2015    Kim et al.
2018/0343578 A1    11/2018    Yeoh et al.
(Continued)

FOREIGN PATENT DOCUMENTS

CN    110169110 A    8/2019
WO    2019220005    11/2019

OTHER PUBLICATIONS

Extended European Search Report for EP Patent Application No. 21899319.4; 10 pages; Oct. 10, 2022.
(Continued)

*Primary Examiner* — Diane L Lo
(74) *Attorney, Agent, or Firm* — Kowert, Hood, Munyon, Rankin & Goetzel, P.C.

(57) ABSTRACT

A user equipment (UE) may receive a measurement reporting capability request from a base station and further transmit, in response to the request, an indication of the UE's measurement reporting capability. The UE may further receive, signaling comprising a channel status information (CSI) request trigger from the base station. In response to receiving the CSI request trigger, the UE may transmit a measurement report to the base station, wherein the measurement report may comprise at least one received signal strength indicator (RSSI) measurement.

20 Claims, 13 Drawing Sheets

(56) References Cited

U.S. PATENT DOCUMENTS

| | | | |
|---|---|---|---|
| 2019/0289552 A1* | 9/2019 | Jain | H04W 52/0261 |
| 2019/0306739 A1 | 10/2019 | Kim | |
| 2019/0363843 A1 | 11/2019 | Gordaychik | |
| 2020/0059836 A1 | 2/2020 | Isokangas et al. | |
| 2020/0295903 A1 | 9/2020 | Faxer | |
| 2021/0028823 A1 | 1/2021 | Park | |
| 2021/0226682 A1* | 7/2021 | Park | H04L 5/005 |
| 2021/0250797 A1 | 8/2021 | Karjalainen | |
| 2022/0278802 A1* | 9/2022 | Noh | H04B 7/06 |
| 2023/0361894 A1* | 11/2023 | Bhamri | H04W 24/10 |

OTHER PUBLICATIONS

Moderator (Qualcomm Inc.) "Contribution summary of channel access mechanism for 52.6GHz-71GHz band, ver 1"; 3GPP 3GPP TSG RAN WG1 Meeting #104bis-3 R1-2105986; 77 pages; May 10, 2021.
Ericsson "Channel access mechanisms"; 3GPP TSG-RAN WG1 Meeting #105-e R1-2104463; 16 pages; May 19, 2021.
International Search Report and Written Opinion for PCT/CN2021/110445; 9 pages; Apr. 29, 2022.
KYOCERA "Recovery due to LBT failures"; 3GPP TSG-RAN WG2 #107 R2-1909640; Praque, CZ; 4 pages; Aug. 30, 2019.
Examination Report for EP Patent Application No. 21899319.4; Nov. 27, 2023.

* cited by examiner

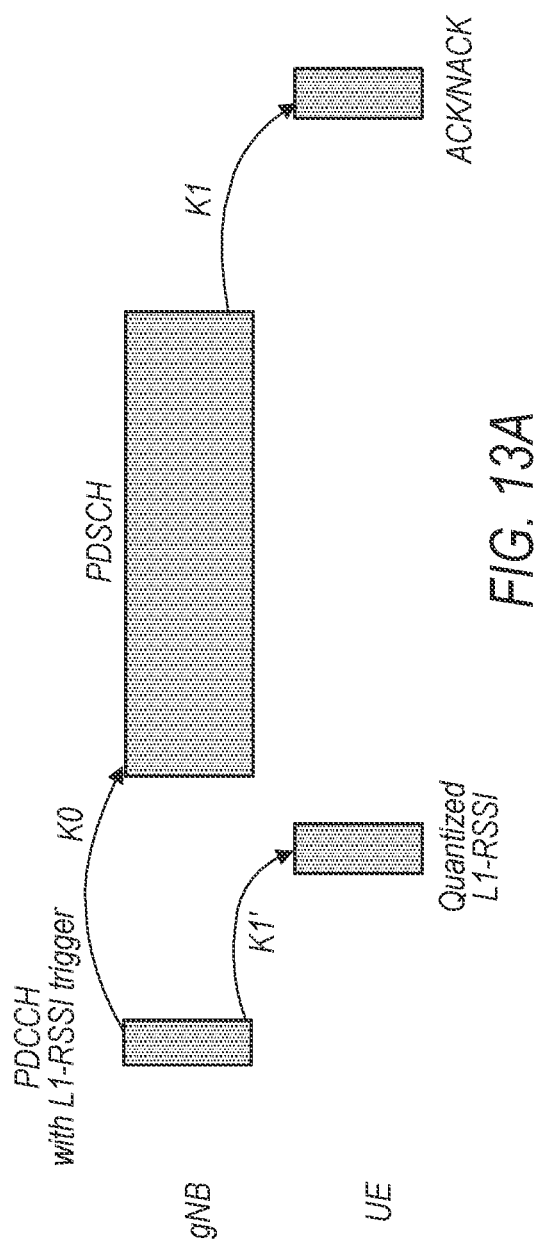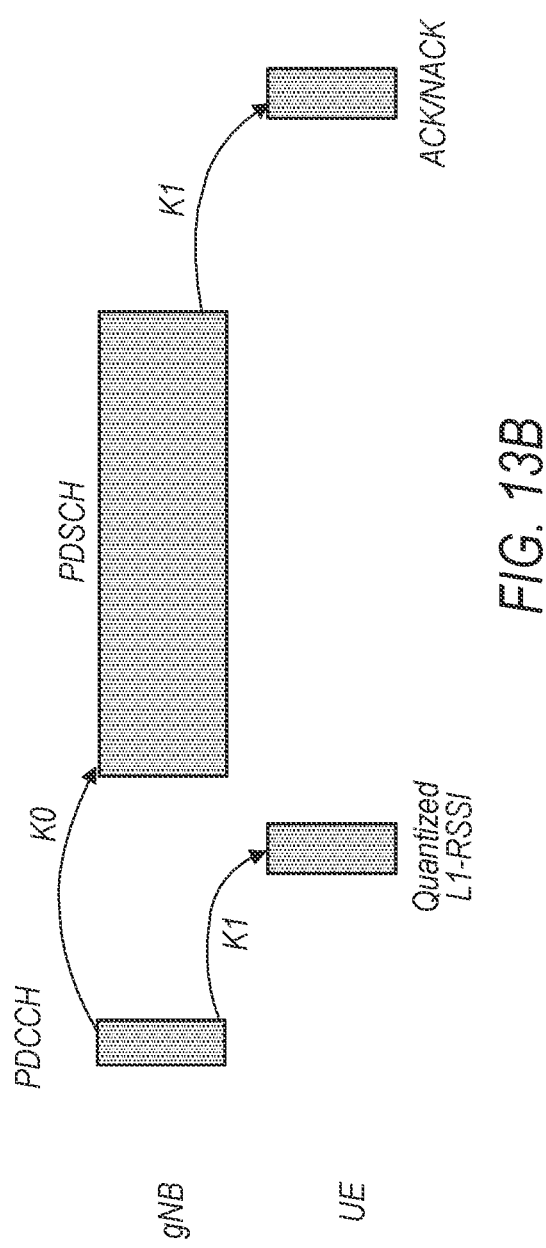

RECEIVER ASSISTED ACCESS MECHANISM IN THE NEW RADIO UNLICENSED SPECTRUM

PRIORITY CLAIM INFORMATION

This application is a U.S. National Stage application of International Application No. PCT/CN2021/110445, filed Aug. 4, 2021, titled "Improved Receiver Assisted Access Mechanism in the New Radio Unlicensed Spectrum", which is hereby incorporated by reference in its entirety.

FIELD

The invention relates to wireless communications, and more particularly to apparatuses, systems, and methods for an improved receiver assisted access mechanism in the New Radio (NR) unlicensed spectrum.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development.

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Further, the 5G-NR standard may allow for less restrictive UE scheduling as compared to current LTE standards. Consequently, efforts are being made in ongoing developments of 5G-NR to take advantage of higher throughputs possible at higher frequencies.

Further, wireless communication technology has evolved from voice-only communications to also include the transmission of data, such as Internet and multimedia content. Additionally, interference, collisions and conflicts between transmissions of one or multiple radio access technologies (RATs) are increasingly possible (e.g., in unlicensed spectrum). For example, collisions may be possible between transmissions, e.g., between 5G/cellular transmissions and/or wireless local area network (WLAN) transmissions. Interference, collisions, and conflicts may degrade the wireless ecosystem and lead to negative impacts on users, e.g., of one or more RATs. Accordingly, improvements in the field in support of such development and design are desired.

SUMMARY

Embodiments relate to wireless communications, and more particularly to apparatuses, systems, and methods for an improved receiver assisted access mechanism in the New Radio (NR) unlicensed spectrum.

In some embodiments, a user equipment (UE) may receive a measurement reporting capability request from a base station and further transmit, in response to the request, an indication of the UE's measurement reporting capability. The UE may further receive signaling comprising a channel status information (CSI) request trigger from the base station. In response to receiving the CSI request trigger, the UE may transmit a measurement report to the base station, wherein the measurement report may comprise at least one received signal strength indicator (RSSI) measurement.

According to some embodiments, the measurement report may be an aperiodic-channel status information (AP-CSI) report and the at least one RSSI measurement may be a layer-1 (L1) RSSI measurement. In some embodiments, the UE may re-use, for the RSSI measurement, an existing processing timeline or existing priority rule corresponding to a reference signal received power (RSRP) measurement.

According to some embodiments, the UE may be configured to perform the RSSI measurement in a time domain. Additionally or alternatively, a measurement time of the RSSI measurement in the time domain may correspond to one orthogonal frequency-division multiplexing (OFDM) symbol for a 120 kHz sub-carrier spacing (SCS), three OFDM symbols for a 480 kHz SCS, and five OFDM symbols for a 960 kHz SCS.

In some embodiments, the RSSI measurement in the time domain may be performed using a receive beam associated with an active transmission configuration indicator (TCI) of the signaling.

According to some embodiments, a zero-power-channel status information-reference signal (ZP-CSI-RS) may be characterized for the RSSI measurement in the time domain. Additionally or alternatively, the RSSI measurement may be measured from one or more symbols within or across a slot.

The techniques described herein may be implemented in and/or used with a number of different types of devices, including but not limited to unmanned aerial vehicles (UAVs), unmanned aerial controllers (UACs), base stations, access points, cellular phones, tablet computers, wearable computing devices, portable media players, automobiles and/or motorized vehicles, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIGS. 13A and 13B illustrate examples of explicit and implicit indications for triggering a measurement report as part of a CCA procedure, according to some embodiments.

Figure 1A:
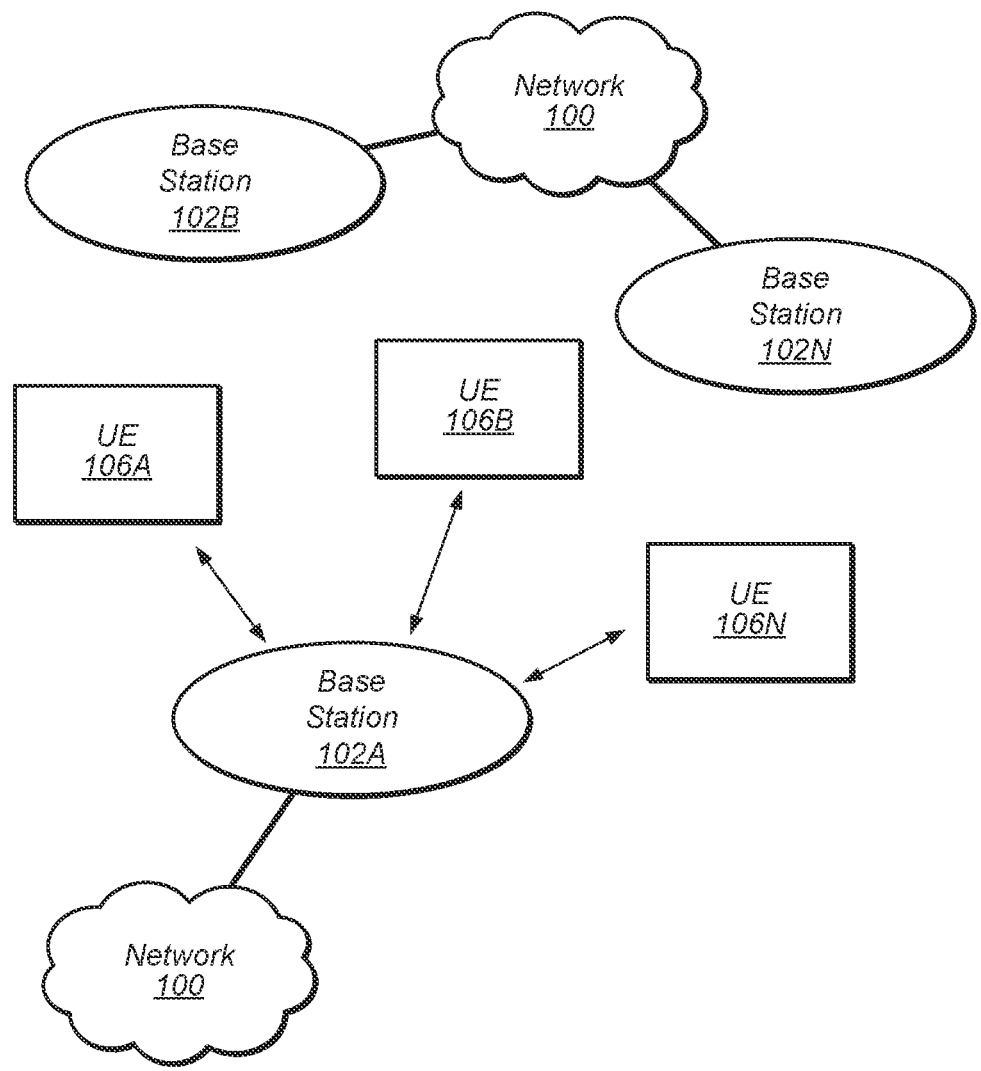
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as characterized by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
TS: Technical Specification
RAN: Radio Access Network
RAT: Radio Access Technology
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC: 5G Core Network
ITS: Intelligent Transportation System
BM: Broadcast Multicast
LBT: Listen Before Talk
SSB: Synchronization Signal Block
RRM: Radio Resource Management
RSSI: Received Signal Strength Indicator
RSRP: Reference Signal Received Power
SCS: Subcarrier Spacing
ACK: Acknowledgement
NACK: Negative Acknowledgement
TX: Transmission/Transmit
RX: Reception/Receive
L1: Layer-1
PDCCH: Physical Downlink Control Channel
PUCCH: Physical Uplink Control Channel
PDSCH: Physical Downlink Shared Channel
PUSCH: Physical Uplink Shared Channel
EDT: Energy Detection Threshold
CAT2: Category 2
ZP-CSI-RS: Zero Power-Channel Status Information-Reference Signal
AP-CSI: Aperiodic-Channel Status Information
CCA: Clear Channel Assessment
eCCA: Extended Clear Channel Assessment
HARQ-ACK: Hybrid Automatic Repeat Request-Acknowledgement
HARQ-ID: Hybrid Automatic Repeat Request-Identifier
DCI: Downlink Control Information
UCI: Uplink Control Information
OFDM: Orthogonal Frequency-Division Multiplexing
TCI: Transmission Configuration Indicator
RE: Resource Element
RB: Resource Block
TDRA: Time Domain Resource Allocation
RRC: Radio Resource Control
MAC-CE: Medium Access Control-Control Element Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly characterized to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™ iPhone™), laptops, wearable devices (e.g. smart watch, smart glasses), PDAs, portable Internet devices, music players, data storage devices, other handheld devices, automobiles and/or motor vehicles, unmanned aerial vehicles (UAVs) (e.g., drones), UAV controllers (UACs), and so forth. In general, the term "UE" or "UE device" can be broadly characterized to encompass any electronic, computing, and/or telecommunications device (or combination of devices) which is easily transported by (or with) a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
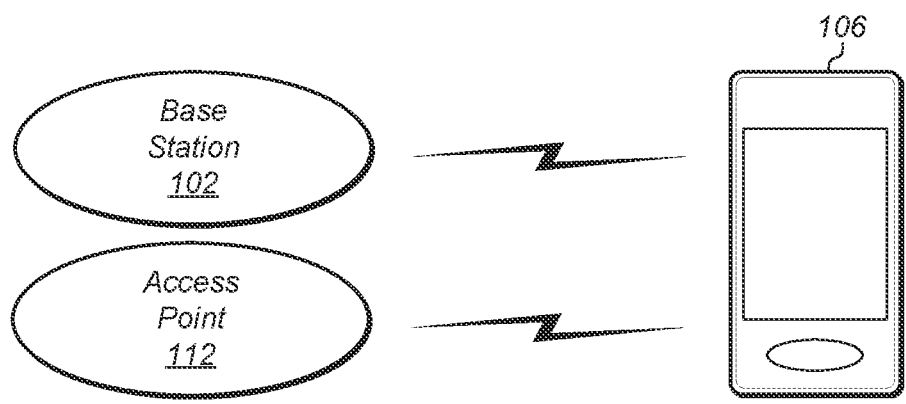
FIG. 1B illustrates an example of a base station (BS) and an access point in communication with a user equipment (UE) device according to some embodiments.

FIGS. 1A and 1B: Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes abase station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5GNR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a handheld device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
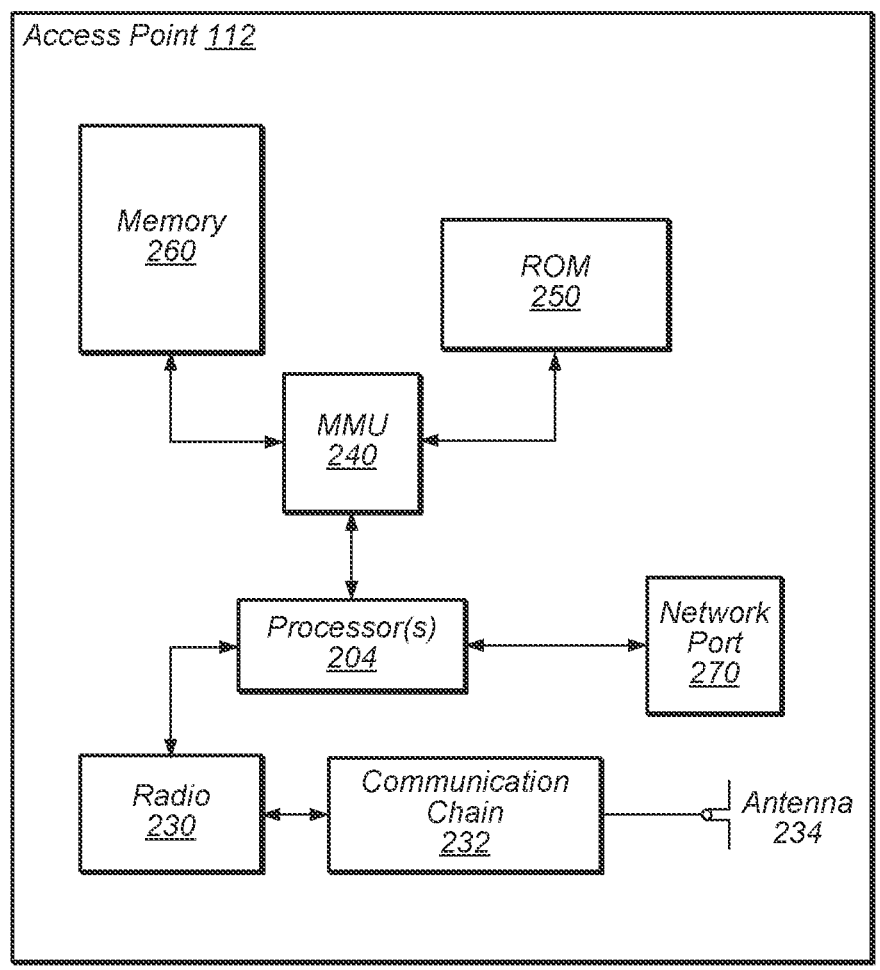
FIG. 2 illustrates an example simplified block diagram of a WLAN Access Point (AP), according to some embodiments.

FIG. 2: Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to perform methods for overhead reduction for multi-carrier beam selection and power control as further described herein.

Figure 3A:
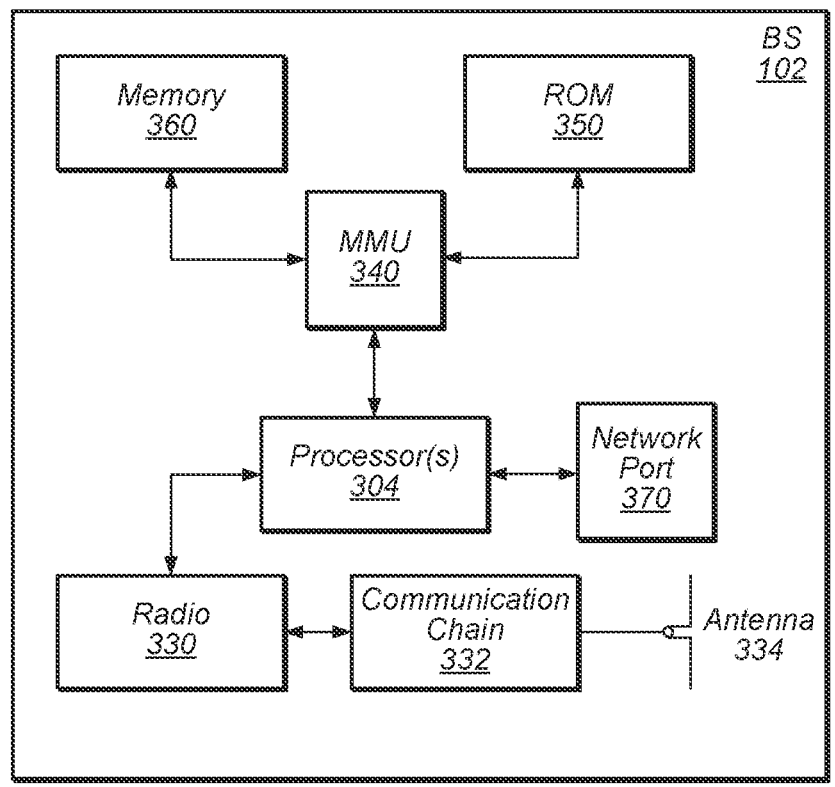
FIG. 3A illustrates an example block diagram of a BS according to some embodiments.

FIG. 3A: Block Diagram of a Base Station

FIG. 3A illustrates an example block diagram of a base station 102, according to some embodiments. It is noted that the base station of FIG. 3A is merely one example of a possible base station. As shown, the base station 102 may include processor(s) 304 which may execute program instructions for the base station 102. The processor(s) 304 may also be coupled to memory management unit (MMU) 340, which may be configured to receive addresses from the processor(s) 304 and translate those addresses to locations in memory (e.g., memory 360 and read only memory (ROM) 350) or to other circuits or devices.

The base station 102 may include at least one network port 370. The network port 370 may be configured to couple to a telephone network and provide a plurality of devices, such as UE devices 106, access to the telephone network as described above in FIGS. 1 and 2.

The network port 370 (or an additional network port) may also or alternatively be configured to couple to a cellular network, e.g., a core network of a cellular service provider. The core network may provide mobility related services and/or other services to a plurality of devices, such as UE devices 106. In some cases, the network port 370 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 334, and possibly multiple antennas. The at least one antenna 334 may be configured to operate as a wireless transceiver and may be further configured to communicate with UE devices 106 via radio 330. The antenna 334 communicates with the radio 330 via communication chain 332. Communication chain 332 may be a receive chain, a transmit chain or both. The radio 330 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 304 of the base station 102 may be configured to implement or support implementation of part or all of the methods described herein, e.g., by executing program instructions stored on a memory medium (e.g., a non-transitory computer-readable memory medium). Alternatively, the processor 304 may be configured as a programmable hardware element, such as an FPGA (Field Programmable Gate Array), or as an ASIC (Application Specific Integrated Circuit), or a combination thereof. Alternatively (or in addition) the processor 304 of the BS 102, in conjunction with one or more of the other components 330, 332, 334, 340, 350, 360, 370 may be configured to implement or support implementation of part or all of the features described herein.

In addition, as described herein, processor(s) 304 may be comprised of one or more processing elements. In other words, one or more processing elements may be included in processor(s) 304. Thus, processor(s) 304 may include one or more integrated circuits (ICs) that are configured to perform the functions of processor(s) 304. In addition, each integrated circuit may include circuitry (e.g., first circuitry, second circuitry, etc.) configured to perform the functions of processor(s) 304.

Further, as described herein, radio 330 may be comprised of one or more processing elements. In other words, one or more processing elements may be included in radio 330. Thus, radio 330 may include one or more integrated circuits (ICs) that are configured to perform the functions of radio 330. In addition, each integrated circuit may include circuitry (e.g., first circuitry, second circuitry, etc.) configured to perform the functions of radio 330.

Figure 3B:
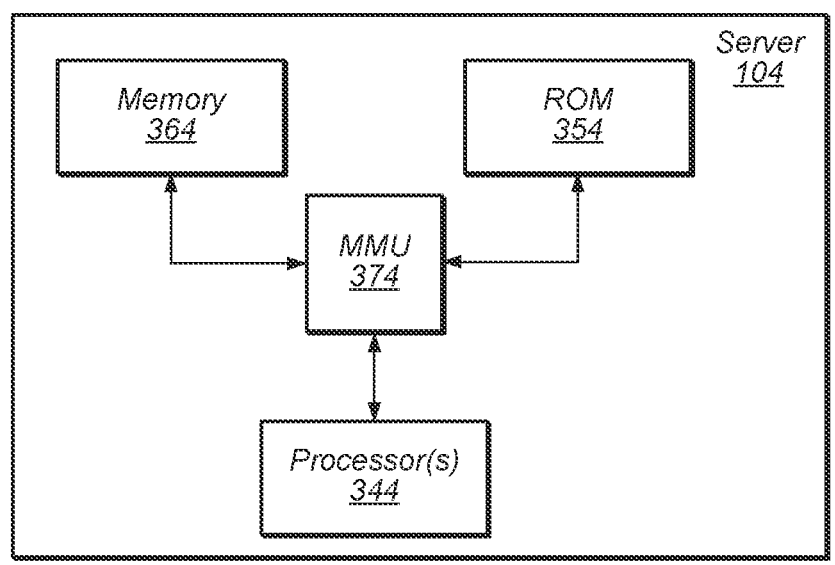
FIG. 3B illustrates an example block diagram of a server according to some embodiments.

FIG. 3B: Block Diagram of a Server

FIG. 3B illustrates an example block diagram of a server 104, according to some embodiments. It is noted that the server of FIG. 3B is merely one example of a possible server. As shown, the server 104 may include processor(s) 344 which may execute program instructions for the server 104. The processor(s) 344 may also be coupled to memory management unit (MMU) 374, which may be configured to receive addresses from the processor(s) 344 and translate those addresses to locations in memory (e.g., memory 364 and read only memory (ROM) 354) or to other circuits or devices.

The server 104 may be configured to provide a plurality of devices, such as base station 102, UE devices 106, and/or UTM 108, access to network functions, e.g., as further described herein.

In some embodiments, the server 104 may be part of a radio access network, such as a 5G New Radio (5GNR) radio access network. In some embodiments, the server 104 may be connected to a legacy evolved packet core (EPC) network and/or to a NR core (NRC) network.

As described further subsequently herein, the server 104 may include hardware and software components for implementing or supporting implementation of features described herein. The processor 344 of the server 104 may be configured to implement or support implementation of part or all of the methods described herein, e.g., by executing program instructions stored on a memory medium (e.g., a non-transitory computer-readable memory medium). Alternatively, the processor 344 may be configured as a programmable hardware element, such as an FPGA (Field Programmable Gate Array), or as an ASIC (Application Specific Integrated Circuit), or a combination thereof. Alternatively (or in addition) the processor 344 of the server 104, in conjunction with one or more of the other components 354, 364, and/or 374 may be configured to implement or support implementation of part or all of the features described herein.

In addition, as described herein, processor(s) 344 may be comprised of one or more processing elements. In other words, one or more processing elements may be included in processor(s) 344. Thus, processor(s) 344 may include one or more integrated circuits (ICs) that are configured to perform the functions of processor(s) 344. In addition, each integrated circuit may include circuitry (e.g., first circuitry, second circuitry, etc.) configured to perform the functions of processor(s) 344.

Figure 4:
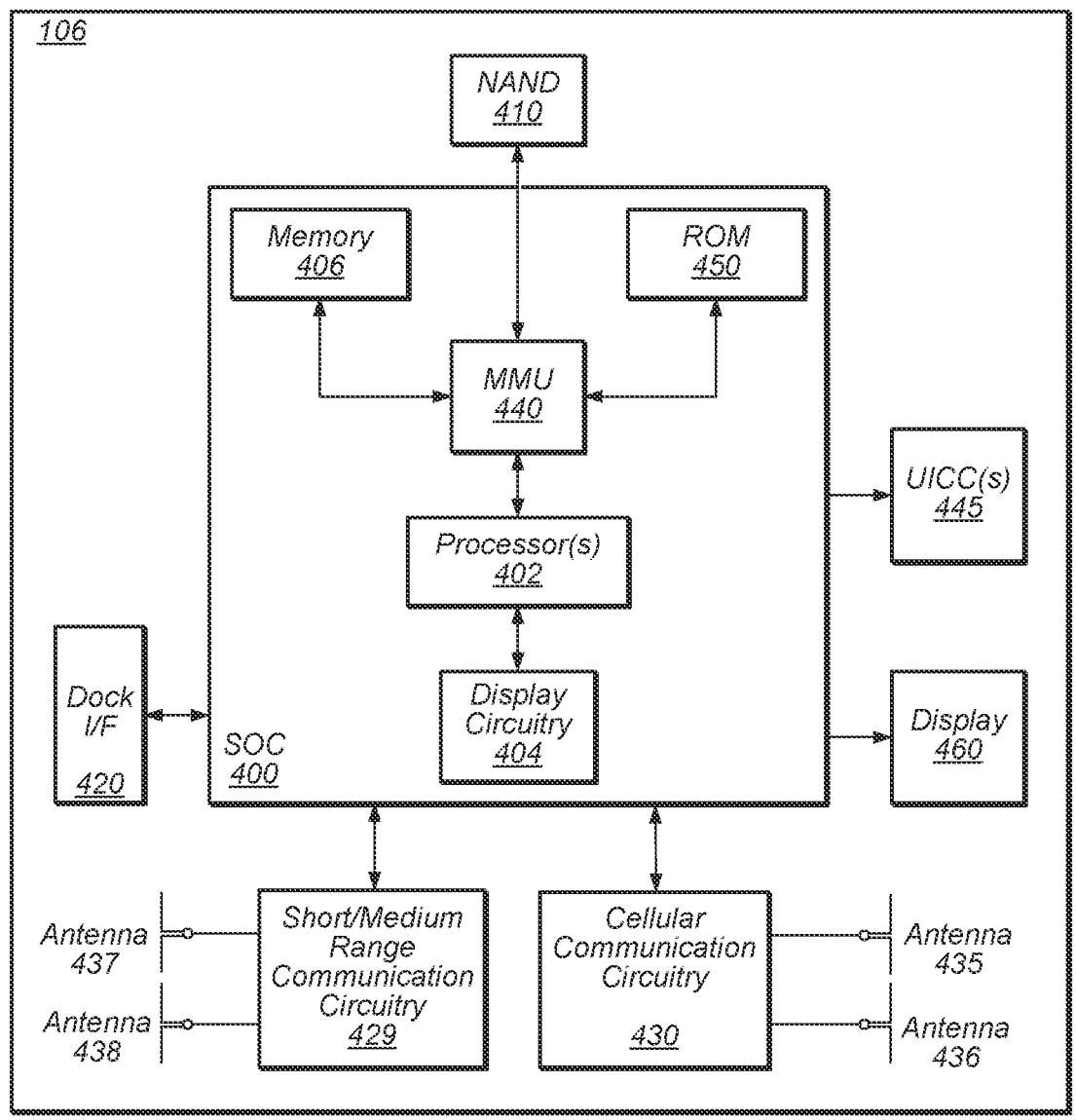
FIG. 4 illustrates an example block diagram of a UE according to some embodiments.

FIG. 4: Block Diagram of a UE

FIG. 4 illustrates an example simplified block diagram of a communication device 106, according to some embodiments. It is noted that the block diagram of the communication device of FIG. 4 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 400 configured to perform core functions. For example, this set of components may be implemented as a system on chip (SOC), which may include portions for various purposes. Alternatively, this set of components 400 may be implemented as separate components or groups of components for the various purposes. The set of components 400 may be coupled (e.g., communicatively; directly or indirectly) to various other circuits of the communication device 106.

For example, the communication device 106 may include various types of memory (e.g., including NAND flash 410), an input/output interface such as connector I/F 420 (e.g., for connecting to a computer system; dock; charging station; input devices, such as a microphone, camera, keyboard; output devices, such as speakers; etc.), the display 460, which may be integrated with or external to the communication device 106, and cellular communication circuitry 430 such as for 5G NR, LTE, GSM, etc., and short to medium range wireless communication circuitry 429 (e.g., Bluetooth™ and WLAN circuitry). In some embodiments, communication device 106 may include wired communication circuitry (not shown), such as a network interface card, e.g., for Ethernet.

The cellular communication circuitry 430 may couple (e.g., communicatively; directly or indirectly) to one or more antennas, such as antennas 435 and 436 as shown. The short to medium range wireless communication circuitry 429 may also couple (e.g., communicatively; directly or indirectly) to one or more antennas, such as antennas 437 and 438 as shown. Alternatively, the short to medium range wireless communication circuitry 429 may couple (e.g., communicatively; directly or indirectly) to the antennas 435 and 436 in addition to, or instead of, coupling (e.g., communicatively; directly or indirectly) to the antennas 437 and 438. The short to medium range wireless communication circuitry 429 and/or cellular communication circuitry 430 may include multiple receive chains and/or multiple transmit chains for receiving and/or transmitting multiple spatial streams, such as in a multiple-input multiple output (MIMO) configuration.

In some embodiments, as further described below, cellular communication circuitry 430 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 430 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 445 that include SIM (Subscriber Identity Module) functionality, such as one or more UICC(s) (Universal Integrated Circuit Card(s)) cards 445. Note that the term "SIM" or "SIM entity" is intended to include any of various types of SIM implementations or SIM functionality, such as the one or more UICC(s) cards 445, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM may be implemented as a removable smart card. Thus, the SIM(s) may be one or more removable smart cards (such as UICC cards, which are sometimes referred to as "SIM cards"), and/or the SIMs 410 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMs, two removable SIMs, or a combination of one embedded SIMs and one removable SIMs. Various other SIM configurations are also contemplated.

As noted above, in some embodiments, the UE 106 may include two or more SIMs. The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VoLTE) technology and/or voice over NR (VoNR) technology. In some embodiments, the UE 106 may support Dual SIM Dual Standby (DSDS) functionality. The DSDS functionality may allow either of the two SIMs in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 400 may include processor(s) 402, which may execute program instructions for the communication device 106 and display circuitry 404, which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, short to medium range wireless communication circuitry 429, cellular communication circuitry 430, connector I/F 420, and/or display 460. The MMU 440 may be configured to perform memory protection and page table translation or set up. In some embodiments, the MMU 440 may be included as a portion of the processor(s) 402.

As noted above, the communication device 106 may be configured to communicate using wireless and/or wired communication circuitry. The communication device 106 may be configured to perform methods for beam failure recovery based on a unified TCI framework, e.g., in 5G NR systems and beyond, as further described herein.

As described herein, the communication device 106 may include hardware and software components for implementing the above features for a communication device 106 to communicate a scheduling profile for power savings to a network. The processor 402 of the communication device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the communication device 106, in conjunction with one or more of the other components 400, 404, 406, 410, 420, 429, 430, 440, 445, 450, 460 may be configured to implement part or all of the features described herein.

In addition, as described herein, processor 402 may include one or more processing elements. Thus, processor 402 may include one or more integrated circuits (ICs) that are configured to perform the functions of processor 402. In addition, each integrated circuit may include circuitry (e.g., first circuitry, second circuitry, etc.) configured to perform the functions of processor(s) 402.

Further, as described herein, cellular communication circuitry 430 and short to medium range wireless communication circuitry 429 may each include one or more processing elements. In other words, one or more processing elements may be included in cellular communication circuitry 430 and, similarly, one or more processing elements may be included in short to medium range wireless communication circuitry 429. Thus, cellular communication circuitry 430 may include one or more integrated circuits (ICs) that are configured to perform the functions of cellular communication circuitry 430. In addition, each integrated circuit may include circuitry (e.g., first circuitry, second circuitry, etc.) configured to perform the functions of cellular communication circuitry 430. Similarly, the short to medium range wireless communication circuitry 429 may include one or more ICs that are configured to perform the functions of short to medium range wireless communication circuitry 429. In addition, each integrated circuit may include circuitry (e.g., first circuitry, second circuitry, etc.) configured to perform the functions of short to medium range wireless communication circuitry 429.

Figure 5:
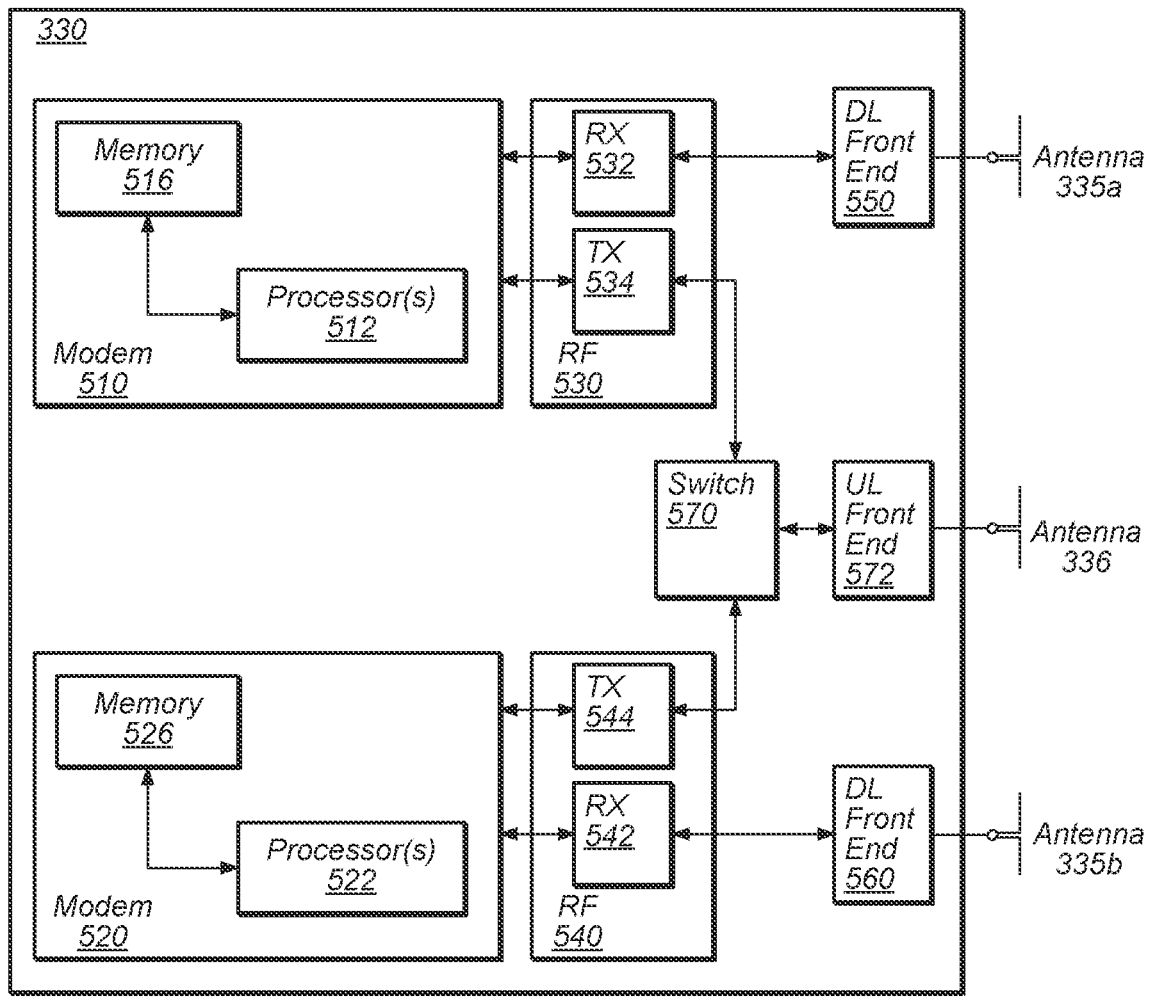
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 530, which may be cellular communication circuitry 430, may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 530 may couple (e.g., communicatively; directly or indirectly) to one or more antennas, such as antennas 435a-b and 436 as shown (in FIG. 4). In some embodiments, cellular communication circuitry 530 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 530 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 530 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 530 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 530 may be configured to perform methods beam failure recovery based on a unified TCI framework, e.g., in 5G NR systems and beyond, as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6A:
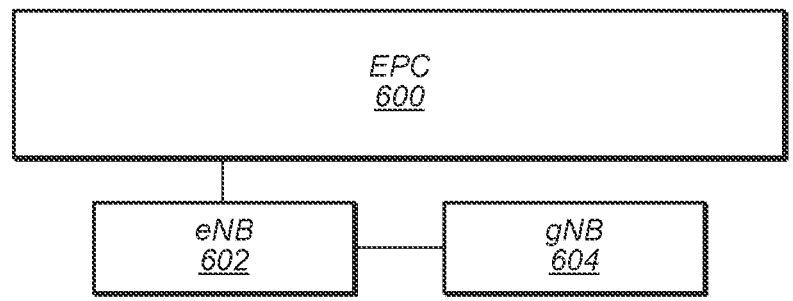
FIG. 6A illustrates an example of connections between an EPC network, an LTE base station (eNB), and a 5G NR base station (gNB).
Figure 6B:
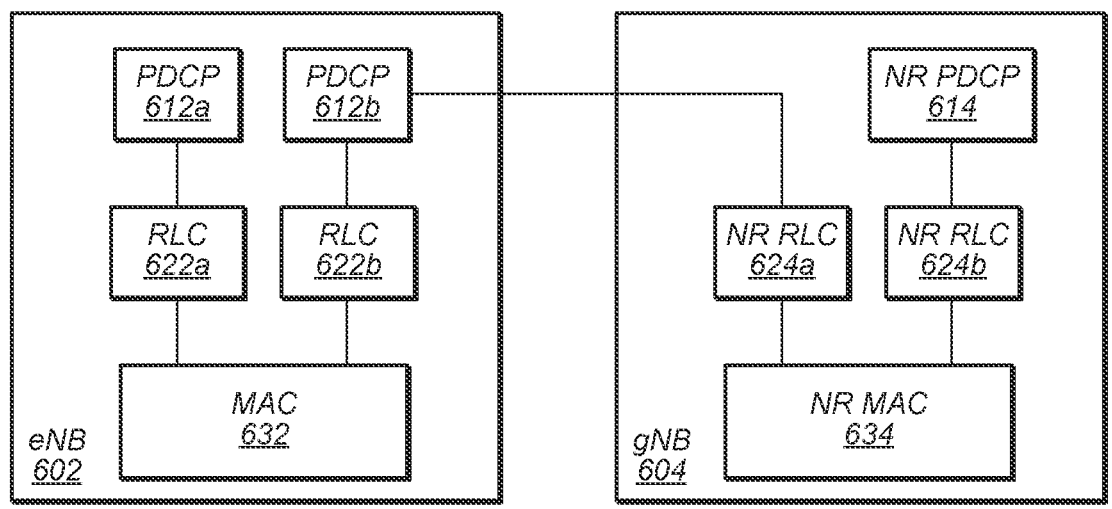
FIG. 6B illustrates an example of a protocol stack for an eNB and a gNB.

FIGS. 6A and 6B: 5G NR Architecture with LTE

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer with EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an $X_2$ interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

Figure 7A:
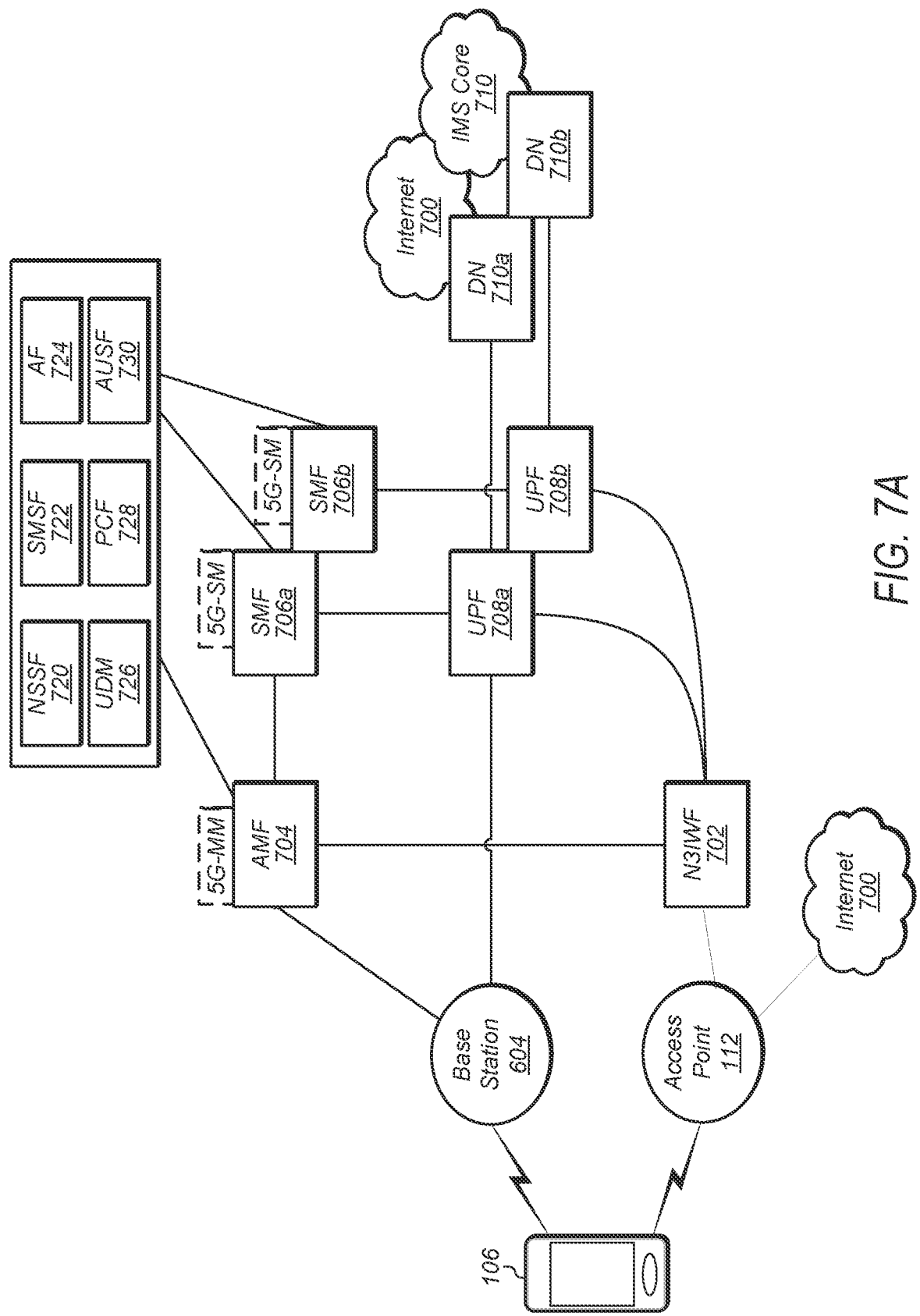
FIG. 7A illustrates an example of a 5G network architecture that incorporates both 3GPP (e.g., cellular) and non-3GPP (e.g., non-cellular) access to the 5G CN, according to some embodiments.
Figure 7B:
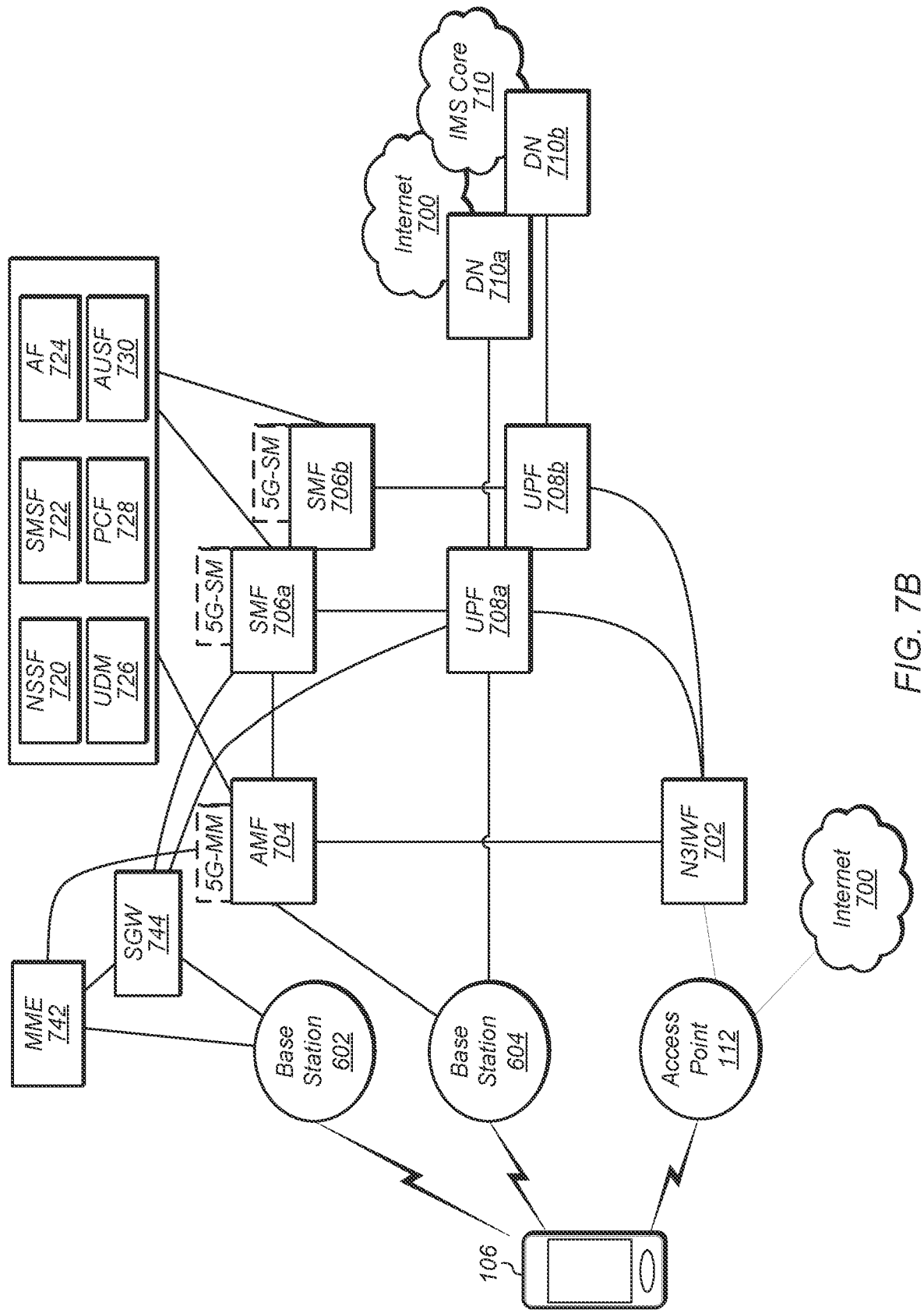
FIG. 7B illustrates an example of a 5G network architecture that incorporates both dual 3GPP (e.g., LTE and 5G NR) access and non-3GPP access to the 5G CN, according to some embodiments.

FIGS. 7A and 7B: 5G Core Network Architecture-Interworking with Wi-Fi

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706a and an SMF 706b of the 5G CN. The AMF 706 may be connected to (or in communication with) the SMF 706a. In some embodiments, such functional entities may reside on (and/or be executed by and/or be supported by) one or more servers 104 located within the RAN and/or core network. Further, the gNB 604 may in communication with (or connected to) a user plane function (UPF) 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to the AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well as allow simultaneous registration for ULE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706a and the UPF 708a. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF706a and the SMF 706b of the 5G CN. The AMF 706 may be connected to (or in communication with) the SMF 706a. In some embodiments, such functional entities may reside on (and/or be executed by and/or be supported by) one or more servers 104 located within the RAN and/or core network. Further, the gNB 604 may in communication with (or connected to) the UPF 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Note that in various embodiments, one or more of the above described network entities may be configured to perform methods to implement mechanisms for a measurement period extension procedure, e.g., as further described herein.

Figure 8:
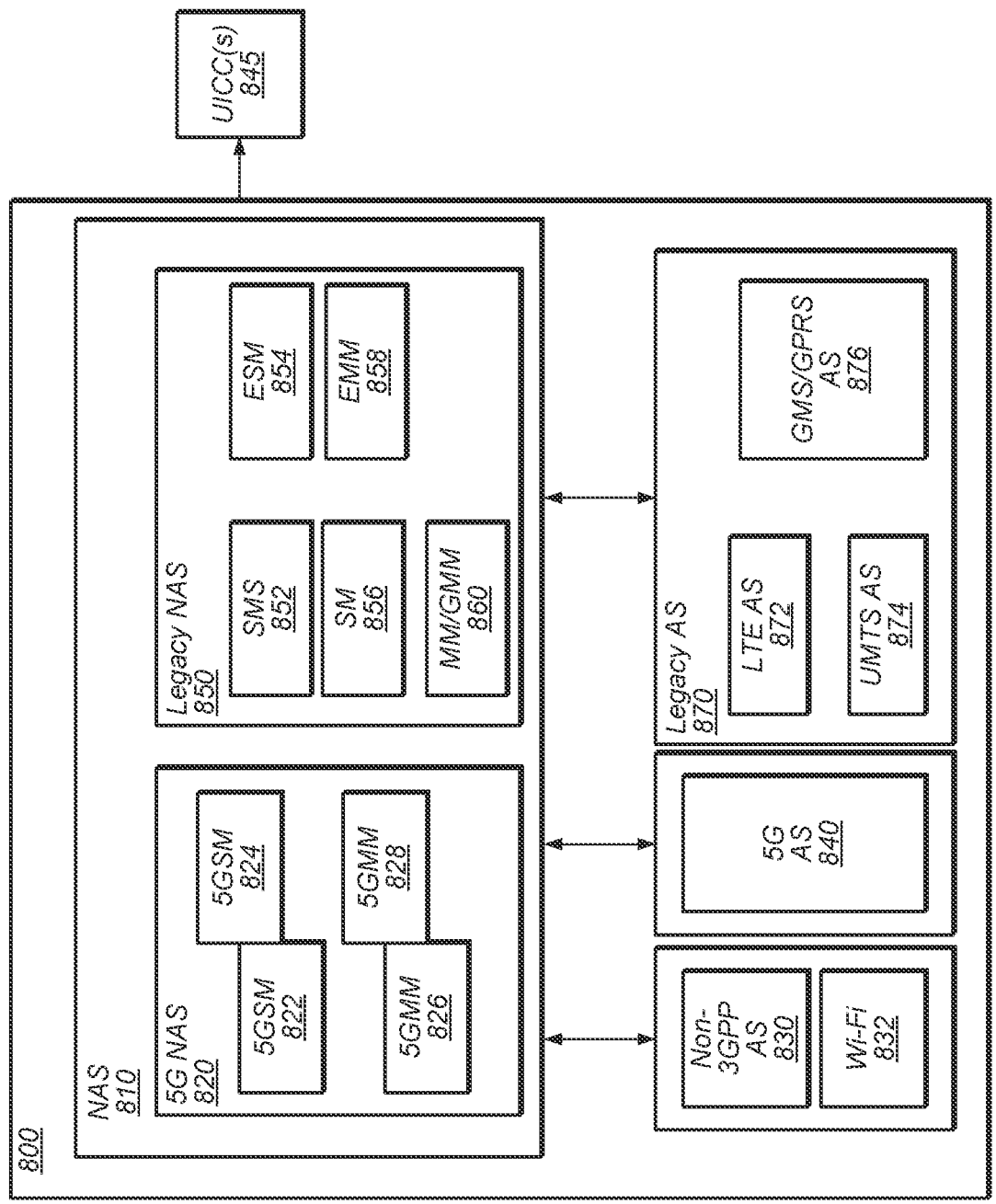
FIG. 8 illustrates an example of a baseband processor architecture for a UE, according to some embodiments.

FIG. 8: Baseband Processor Architecture

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5GNAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods overhead reduction for multi-carrier beam selection and power control, e.g., as further described herein.

Improved Receiver Assisted Access Mechanism in the New Radio Unlicensed Spectrum In recent developments of wireless standards, receive (Rx) assisted access has been studied to provide enhancement for communications. For a receiver (e.g., a UE) to provide assistance, channel sensing and reporting may be performed by the UE in order to assess the characteristics (e.g., power measurements) of one or more wireless channels and accordingly inform the network of said characteristics. In some embodiments, the UE may perform channel sensing using received signal strength indicator (RSSI) measurements and reporting. For example, in some embodiments, the RSSI measurement may be compared with an energy detection threshold (EDT), according to some embodiments. In some embodiments, the UE may perform beam specific RSSI measurement and reporting and/or zero-power-channel status information-reference signal (ZP-CSI-RS) based RSSI measurements. Additionally or alternatively, the UE may provide layer-1 (L1) RSSI reporting in the form of a special CSI report.

In some embodiments, the UE may utilize an enhanced aperiodic channel status information report (AP-CSI), although other specific reports (e.g., CSI reports) are also envisioned. For example, if a UE is configured with aperiodic CSI reporting, the UE may report CSI when both CSI-interference measurement (CSI-IM) and Zero Power-Channel Status Information-Reference Signal (NZP-CSI-RS) resources are configured as periodic, semi-persistent or aperiodic. Furthermore, the time and frequency resources that may be used by the UE to report CSI may be controlled by the base station (e.g., gNB). Moreover, CSI may include Channel Quality Indicator (CQI), precoding matrix indicator (PMI), CSI-RS resource indicator (CRI), SS/PBCH Block Resource indicator (SSBRI), layer indicator (LI), rank indicator (RI), L1-RSRP, L1-RSSI, and/or layer-1 signal-to-noise interference ratio (L1-SINR). Additionally or alternatively, the UE may perform aperiodic CSI reporting using PUSCH on a serving cell upon successful decoding of a DCI format 0-1 or DCI format 0-2 which may further trigger an aperiodic CSI trigger state. In some embodiments, a UE may perform semi-persistent CSI reporting on the PUSCH upon successful decoding of a DCI format 0-1 or DCI format 0-2 which may activate a semi-persistent CSI trigger state.

As another form of receiver assisted access, the UE may also perform listen before talk (LBT) operations as the receiver. LBT may further be characterized by the UE performing a clear channel assessment (CCA) before attempting to use the channel. For example, the UE may perform a CCA procedure to listen or monitor for the CCA observation time duration for the appropriate channel. The channel may be considered occupied if the energy level in the channel exceeds a certain threshold. Accordingly, if the UE determines that the channel is occupied (e.g., the measured energy level exceeds the threshold), the UE may delay further attempts to access the channel.

Moreover, in some embodiments, the UE may perform extended clear channel assessment (eCCA) in order to assess the occupancy characteristics or states of one or more channels. For example, the UE may perform an eCCA procedure in order to utilize a flexible CCA observation time duration to listen or monitor for energy levels in the channel. Additionally or alternatively, the UE may perform category 2 (Cat2) LBT which may correspond to performing a "one-shot" LBT or LBT without random back-off and may further have a determined CCA period or duration. In other words, Cat2 LBT may correspond to having a fixed sensing period within a frame or subframe and may also not include a back-off period corresponding to a portion of the frame or subframe preceding the sensing period. In some embodiments, the back-off period may be generated based on random values in order facilitate channel time or spacing between contended resources and potentially mitigate resource collisions. LBT category 3 (Cat3) and category 4 (Cat4), in contrast, may utilize variable sensing periods and additionally include random back-off periods. These other categories of LBT may be used in various embodiments described herein.

In some existing implementations, a listen before talk (LBT) mechanism may be used to access shared medium (e.g., such as unlicensed bands commonly used for Wi-Fi, Bluetooth, and other short to medium range communications, e.g., non-3GGP access) to avoid conflicts or collisions (e.g., of transmissions emanating from two or more wireless devices attempting to access the shared medium) and to improve medium utilization efficiency. However, LBT mechanisms are not collision free. In other words, LBT mechanisms cannot guarantee collision free transmissions.

For example, in the case of a uni-cast transmission, a transmitter may readily detect a transmission collision based on a receiver's acknowledgement/negative acknowledgement (ACK/NACK) feedback. However, in the case of a multi-cast (or group-cast) transmission, a transmitter may not easily detect a collision based on receivers' ACK/NACKs due, at least in part, to heavy traffic associated with ACK/NACKs from multiple receivers and to a transmitter's inability to distinguish between (or isolate) transmission collisions from channel quality issues based on received ACK/NACKs. In other words, since receivers in a multi-cast transmission may have different locations with differing channel quality, a reason for a NACK (e.g., transmission collision versus poor channel quality) cannot be determined by the transmitter. Additionally, in the case of a broadcast transmission, feedback from receivers is known to not be feasible, thus, a transmitter has no knowledge of collisions. Further, in some implementations, a transmitter may reserve periodic slots within a reservation period for communication. In such implementations, if collisions occur, the collisions could persist for at least a portion of the reservation period (and in a worst-case scenario, the duration of the reservation period) if the transmitter does not detect (or is unable to detect) the collisions.

In current implementations of 3GPP 5G NR, studies in extending current NR operation to 71 GHz are related to UE measurements involving physical layer procedures. For example, some studies have been directed toward enhancing timing associated with beam-based operations to new sub-carrier spacing (e.g., 480 kHz and/or 960 kHz) in shared spectrum operations. Additionally, other studies have been directed toward channel access mechanisms using beam-based operations that comply with regulatory requirements associated with the unlicensed spectrum between 52.6 GHz and 71 GHz. Furthermore, some studies have attempted to specify listen before talk (LBT) and non-LBT procedures (of which no additional sensing mechanism is specified) with regard to omni-directional LBT, directional LBT, energy detection threshold enhancement, and receiver assistance in channel access. Moreover, some core specifications regarding new bands for the 52.6 GHz-71 GHz frequency range have been discussed in addition to defining uplink (UL) and downlink (DL) operation within the bands and excluding the intelligent transportation system (ITS) spectrum in said frequency range. Additionally, gNB (e.g., a base station), UE radio-frequency (RF), radio resource management (RRM), radio link monitoring (RLM), and broadcast multicast (BM) core requirements for bands (and combinations of bands) in the 52.6 GHz-71 GHz frequency range have also been studied.

Furthermore, when a UE makes a cell specific measurement during a LBT procedure in a NR environment, the UE may be susceptible to or experience LBT failures. These LBT failures may involve the UE performing beam measurements in the higher, unlicensed spectrum of the 52.6 GHz-71 GHz frequency range.

While embodiments described below discuss L1-RSSI and various specific CSI reports, any of various messages, measurements, reports, etc. may be used. One example of a receiver assistance technique may involve transmitting measurements (e.g., the L1-RSSI measurement) as part of an enhanced report (e.g., an AP-CSI report), according to some embodiments. Additionally or alternatively, the timeline of measurements, reporting configurations, triggering, measurement configurations and resources of L1-RSSI and/or ZP-CSI-RS based measurements, beam specific RSSI measurements and reporting, contents of the L1-RSSI report (e.g., the value of RSSI measurement and/or comparison outcome with EDT), and CCA/eCCA based receiver assistance may also be utilized as part of receiver assisted access techniques.

In some embodiments, the measurement (e.g., a L1-RSSI) may be included as an enhanced report (e.g., an AP-CSI report) enhancement involving enhanced or altered parameters involving triggering, report configuration (e.g., Report-Config), timeline, priority, measurement, and the report format over PUSCH. Additionally or alternatively, the UE may provide receive assisted access through use of LBT in Rx, according to some embodiments. For example, a base station may trigger the measurement to be reported through use of a downlink DCI (downlink control information) transmission. Moreover, the PDSCH transmission from the base station may further depend on the measurement (which may be quantized) and reported in PUCCH or PUSCH.

Figure 9:
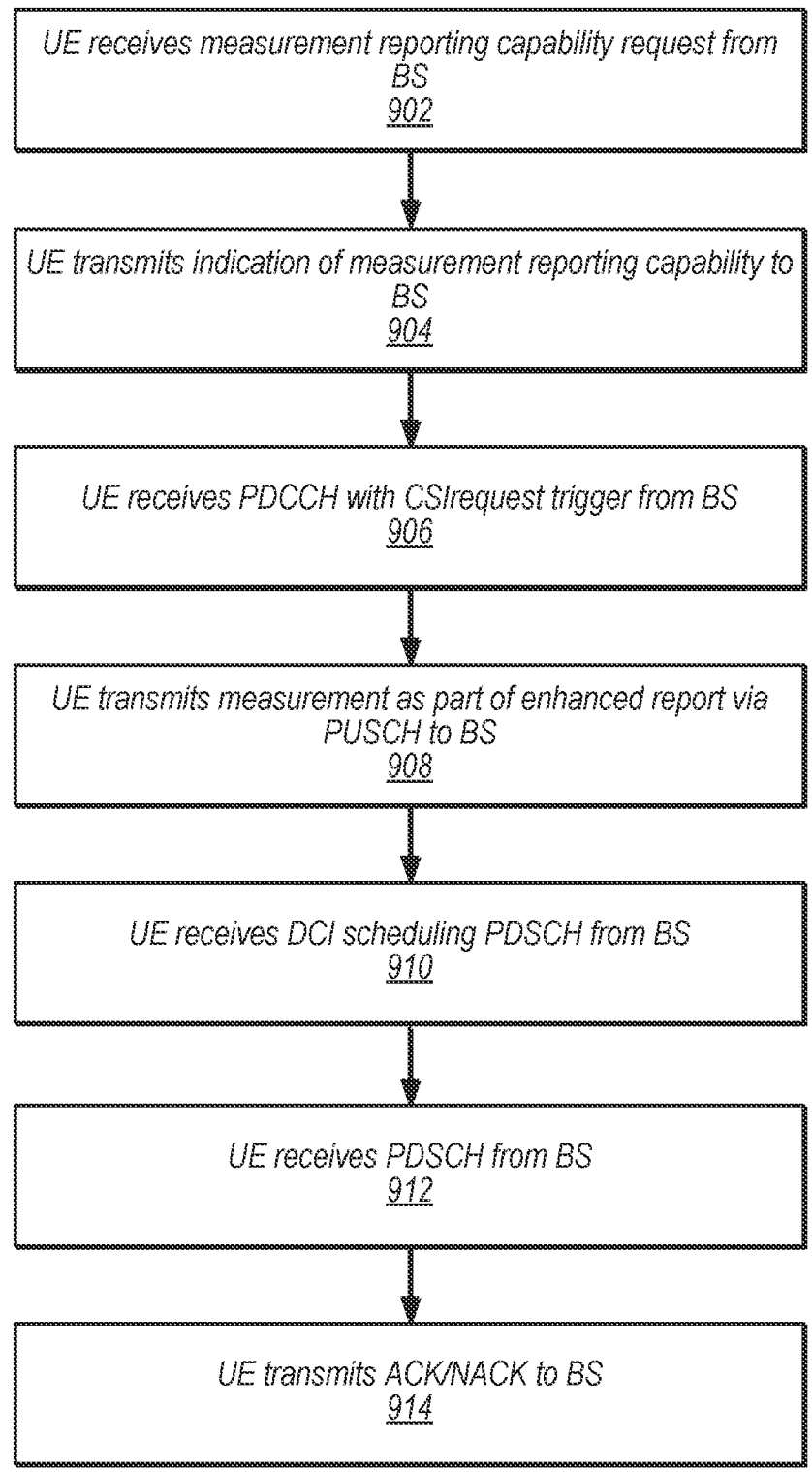
FIG. 9 is a flowchart illustrating an example method of including a measurement as part of an enhanced report, according to some embodiments.

FIG. 9—Method of Including Measurements as part of Enhanced Reports

FIG. 9 is a flowchart diagram illustrating an example method of including a measurement as part of an enhanced report, according to some embodiments.

Aspects of the method of FIG. 9 may be implemented by a wireless device, such as the UE(s) 106, in communication with one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 402, baseband processor(s), processor(s) associated with communication circuitry, etc., among various possibilities) may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

In 902, the UE may receive a measurement reporting capability request from a base station. More specifically, the base station may be requesting an indication from the UE regarding the UE's capability in reporting measurements (e.g., L1-RSSI) as part of an enhanced report (e.g., an AP-CSI report). For example, some UEs may not support this capability due to the hardware or software configurations implemented in older UEs. However, newer UEs may possess the hardware and/or software specifications or configurations to support the capability of including measurements as part of an enhanced report.

In 904 the UE may, in response to the measurement reporting capability request from the base station, transmit an indication of its measurement reporting capability to the base station. For example, the UE may respond to the BS that it does or does not support L1-RSSI measurement reporting as part of an AP-CSI report configuration. Furthermore, the UE may indicate the aforementioned capability or lack thereof using certain bit parameter assignments in the response transmission. In some embodiments, the assigned bits may correspond to binary "true" or "false" parameters corresponding to "1" or "0" values, respectively. According to some embodiments, a parameter such as rssi-csi-dynamicChannelAccess-r17, for example, may be used to indicate whether the UE supports L1-RSSI measurement reporting as part of an AP-CSI enhancement.

In 906 the UE may, having indicated in 904 that it is capable of including certain measurements (e.g., L1-RSSI) as part of an enhanced report (e.g., an AP-CSI report), receive or decode a physical downlink control channel (PDCCH) transmission from the base station which may further include a CSIrequest trigger. For example, the PDCCH transmission may include a CSIrequest field which may be set or assigned a certain parameter in order to trigger the measurement report. In some embodiments, the base station may utilize DCI Format 0-1 and DCI Format 0-2 with the CSIrequest field in order to indicate the measurement report trigger. Moreover, the CSI request parameter may include 0-6 bits which may be further determined by a higher layer parameter such as reportTriggerSize, according to some embodiments. Additionally, it may be necessary for the enhanced report (e.g., AP-CSI report) configuration to include the measurement (e.g., L1-RSSI). An example code block of the aforementioned parameters is shown below.

```
CSI-ReportConfig ::= SEQUENCE {
reportConfigId       CSI-ReportConfigId,
carrier    ServCellIndex OPTIONAL, --
... ...
reportQuantity CHOICE {
none NULL,
cri-RI-PMI-CQI NULL,
cri-RI-i1 NULL,
cri-RI-i1-CQI SEQUENCE {
pdsch-BundleSizeForCSI ENUMERATED {n2, n4}
OPTIONAL -- Need S
},
cri-RI-CQI NULL,
cri-RSRP NULL,
ssb-Index-RSRP NULL,
cri-RI-LI-PMI-CQI NULL
```

-continued

```
RSSI NULL
},
......
}
```

In 908 the UE may, in response to receiving the PDCCH transmission from the base station, transmit a measurement (e.g., a quantized L1-RSSI) as part of an enhanced report (e.g., AP-CSI report) via a PUSCH transmission. More specifically, the PDCCH transmission from the base station may include a trigger which may in turn cause the UE to transmit the measurement as part of an enhanced report. Accordingly, the UE may perform measurements or sensing of appropriate channels in order to generate the measurement. Moreover, the measurement may be quantized (e.g., comprising bit fields in the data transmission) such that the measurement indicates a measured value (e.g., L1-RSSI value), according to some embodiments. Additionally or alternatively, the measurement may be quantized based on a comparison to an energy detection threshold (EDT) value.

In 910, the UE may receive or decode DCI from the base station pertaining the scheduling of a PDSCH transmission. For example, based on the feedback received from the UE the BS may transmit scheduling information pertaining to a PDSCH transmission. According to some embodiments, if the UE previously indicated via the measurement (L1-RSSI) in the enhanced report (e.g., AP-CSI report) that the channel was not noisy (e.g., low interference levels), the base station may proceed with transmitting DCI in order to schedule a transmission via PDSCH. Additionally or alternatively, if the UE's quantized measurement (e.g., L1-RSSI) was indicative of a noisy channel (e.g., high interference levels), the base station may optionally or automatically cancel the PDSCH transmission and therefore not transmit the DCI scheduling information. In some embodiments, the base station (e.g., gNB) may transmit PDCCH signaling with a larger control channel element (CCE) aggregation level. Additionally or alternatively, the DCI may schedule a PDSCH with a lower mission critical services (MCS) index if the L1-RSSI indicates a noisy channel but the interference level can still sustain lower rate transmissions. In other words, the base station (e.g., gNB) may adapt the PDCCH and PDSCH transmissions to the UE based on the quantized feedback (e.g., L1-RSSI) it received in 908.

In 912, the UE may receive the PDSCH transmission from the base station. Accordingly, the UE may receive the PDSCH as a result of the quantized measurement indicating to the base station that the measured channel had low interference levels and was not noisy.

In 914, the UE may transmit an acknowledgement (ACK) or negative-acknowledgement (NACK) to the base station. Accordingly, the base station may utilize this ACK or NACK for determination of successful reception or failure of the previously transmitted PDSCH transmission. Accordingly, if the BS receives a NACK from the UE, the BS may optionally cease further attempts at communication with the UE or alternatively may attempt to restart the measurement reporting process at 902.

Figure 10:
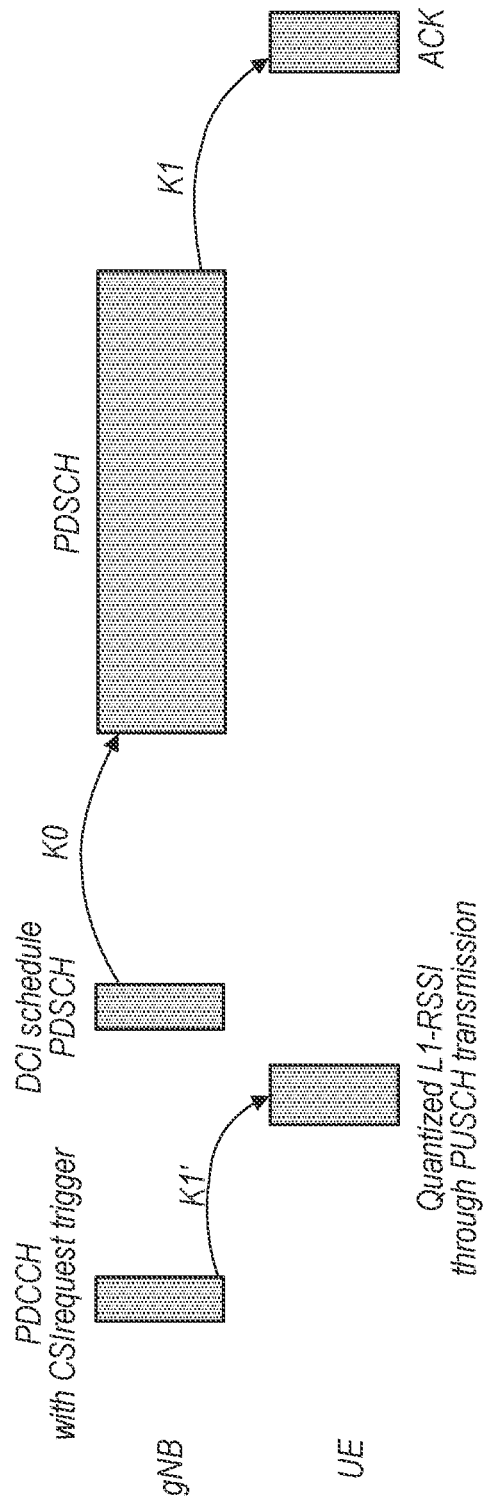
FIG. 10 illustrates an example communication flow of including a L1-RSSI measurement as part of an AP-CSI report, according to some embodiments.

FIG. 10—Communication Flow of Including a L1-RSSI Measurement as part of AP-CSI Report FIG. 10 illustrates an example communication flow between the UE and base station (e.g., gNB) when including a L1-RSSI measurement as part of an AP-CSI report, according to some embodiments.

As briefly discussed above in regard to FIG. 9, the UE may first receive a capability request from a base station and respond to the base station with an indication of its capability (or lack thereof) to include a quantized L1-RSSI measurement as part of an AP-CSI report.

Accordingly, the UE may receive or decode a PDCCH transmission from the base station including a CSIrequest trigger. More specifically, if the UE has indicated that it supports the capability to include the L1-RSSI measurement as part of the AP-CSI report, the base station may respond with a L1-RSSI triggering PDCCH transmission, according to some embodiments. Moreover, the base station may schedule the PDCCH transmission such that it corresponds to offset value K1' (K1 prime).

Next, the UE may, in response to receiving the PDCCH, transmit a quantized L1-RSSI (as part of an AP-CSI report) to the base station via a PUSCH transmission. More specifically, during offset value K1', the UE may decode the DCI associated with the PDCCH transmission with the CSIrequest trigger, perform the RSSI measurement, and accordingly transmit via PUSCH the quantized L1-RSSI report as part of an AP-CSI report.

In response to transmitting a L1-RSSI that is indicative of a low noise or low interference channel, the UE may receive or decode DCI from the base station pertaining the scheduling of a PDSCH transmission and further associated with offset period K0. More specifically, K0 may correspond to the offset between the DL slot where the PDCCH (e.g. DCI) for downlink scheduling is received and the DL slot where PDSCH is scheduled.

Accordingly, the UE may receive the PDSCH transmission from the base station and further transmit an ACK response to the base station upon successful reception of the PDSCH transmission. Furthermore, the ACK response may correspond to offset period K1 which may be characterized as the offset between the DL slot at which the data is scheduled on PDSCH and the UL slot at which the ACK/NACK feedback for the scheduled PDSCH data is to be transmitted.

Figure 11:
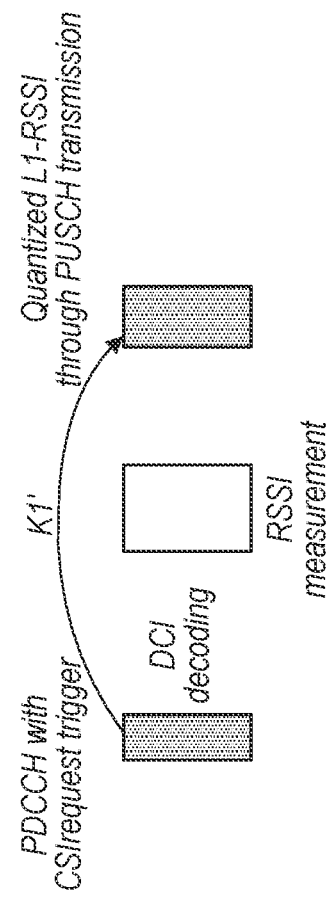
FIG. 11 illustrates example processing timelines and priority characteristics of including a measurement as part of an enhanced report, according to some embodiments.

FIG. 11—Timeline and Priorities for Including a Measurement as part of an Enhanced Report FIG. 11 illustrates an example embodiment of processing timelines and priorities associated with including a measurement as part of an enhanced report, according to some embodiments.

For example, as shown in FIG. 11, a UE may decode DCI corresponding to a PDCCH with the CSIrequest trigger received from a base station. Moreover, the PDCCH may be configured by the base station (e.g., gNB) such that the base station has enough time to process a measurement (e.g., L1-RSSI) for DCI before PDSCH transmission at K0. In other words, it may be necessary for the base station to wait, receive, and process the measurement (corresponding to K1'). During this time, the UE may perform a measurement (e.g., a L1-RSSI) and further transmit a quantized measurement via PUSCH.

In some embodiments, including the measurement (e.g., L1-RSSI) as part of an enhanced report (e.g., AP-CSI) may further include utilizing a processing timeline (e.g., CSI processing timeline). For example, according to some embodiments, the L1-RSSI may be able to re-use the layer 1 reference signal received power (L1-RSRP) processing timeline which may involve 480 kHz subcarrier spacings (SCS) and 960 kHz SCS. Additionally or alternatively, the L1-RSSI processing timeline and/or measurement may occur faster than the L1-RSRP processing timeline due to the L1-RSSI being based on energy sensing in the time domain and that frequency domain processing may not be necessary. Moreover, the L1-RSSI measurement may use zero or one CSI Processing Unit (CPU) at a maximum, according to some embodiments.

In some embodiments, the L1-RSSI may utilize a priority rule for CSI reports. For example, a first CSI report may have priority over a second CSI report if the associated priority value (e.g., k) is lower for the first report than for the second report. In one example, the L1-RSSI may be able to re-use the L1-RSRP priority rule (e.g., k=0), according to some embodiments. Additionally or alternatively, the L1-RSSI may be associated with a lower priority than the CSI (e.g., k=1). However, a collision may occur between two CSI reports if the time occupancy of the physical channels scheduled to carry the CSI reports overlap in at least one OFDM symbol and are transmitted on the same carrier.

According to some embodiments, a RSSI measurement may be used to sense the overall environment in unlicensed band (which may include certain 802.11ad and 802.11ay technologies/standards). Moreover, the L1-RSSI measurement (as part of an AP-CSI report) may further include a RSSI measurement configuration in the time domain.

For example, in some embodiments, the measurement time for a L1-RSSI measurement may be greater than or equal to a 5 microsecond CCA slot time which may correspond to a minimum timing slot. More specifically, for a 120 kHz SCS, the L1-RSSI measurement time may correspond to one orthogonal frequency-division multiplexing (OFDM) symbol and for 480 kHz and 960 kHz SCSs, the L1-RSSI measurement time may correspond to three and five OFDM symbols respectively.

Additionally or alternatively, the ZP-CSI-RS may be characterized for the L1-RSSI measurement. For example, the ZP-CSI-RS may be characterized with a new measurement resource configuration (rather than the legacy zero power configuration corresponding to resource block/resource element estimation) such that the new pattern occupies the entire amount of OFDM symbols, according to some embodiments. Additionally or alternatively, a parameter such as CSI-reportConfigID for L1-RSSI may be linked to a Null OFDM symbol directly. These alternative configurations may allow for the UE to, when not transmitting, utilize certain gaps or spacings to perform RSSI measurements of its nearby environment (e.g., channels).

In some embodiments, the L1-RSSI may be measured from symbols within a slot. Additionally or alternatively, the L1-RSSI may be measured from symbols across a slot. For example, the L1-RSSI measurement time corresponding to three and five OFDM symbols (for 480 kHz and 960 kHz SCSs) may extend across slot boundaries According to some embodiments, the time domain measurement restriction for L1-RSSI may not be configurable and therefore the UE may utilize a "one-shot" measurement corresponding to LBT Category 2.

In some embodiments, the UE may utilize a directional L1-RSSI. For example, the UE may measure L1-RSSI using the Rx beam associated with the active TCI state of the triggering PDCCH. Additionally or alternatively, the UE may measure L1-RSSI using the Rx beam based on the default PDSCH beam if the triggering PDCCH does not carry the active TCI state.

According to some embodiments, the L1-RSSI may reuse the L3-RSSI report range. For example, an information element (IE) such as RSSI-Range may specify the value range used in RSSI measurements and thresholds for operation (e.g., new radio (NR)) with shared spectrum channel access. More specifically, the L1-RSSI report range may be characterized as "RSSI-Range-r16:: INTEGER(0 . . . 76)" where the reporting range of the measurements may be defined from −100 dBm to −25 dBm with a 1 dBm resolution. For example, a RSSI reported value of "RSSI 00" may correspond to a RSSI measured quantity value of less than −100 dBm, a RSSI reported value of "RSSI 01" may correspond to a RSSI measured quantity value greater than or equal to −100 dBm and less than −99 dBm, and a RSSI reported value of "RSSI 02" may correspond to a RSSI measured quantity value greater than or equal to −99 dBm and less than −98 dBm, according to some embodiments. Moreover, this characterization may continue for the L1-RSSI reporting range such that a RSSI reported value of "RSSI 75" may correspond to a RSSI measured quantity value greater than or equal to −26 dBm and less than −25 dBm and a RSSI reported value of "RSSI 76" may correspond to a RSSI measured quantity value greater than or equal to −25 dBm.

Additionally or alternatively to the time domain measurement configuration, the L1-RSSI measurement (as part of an AP-CSI report) may further include a RSSI measurement configuration in the frequency domain, according to some embodiments.

In some embodiments, the UE may be configured to re-use the existing ZP-CSI-RS configuration for the L1-RSSI measurement. Additionally or alternatively, the UE may be configured to define a new ZP-CSI-RS configuration pattern which may further enable continuous REs (e.g., RB-based) estimation. According to some embodiments, frequency domain RSSI measurements may not capture, characterize or sense interference from 802.1 lad sources as well as time domain based RSSI measurements.

Figure 12:
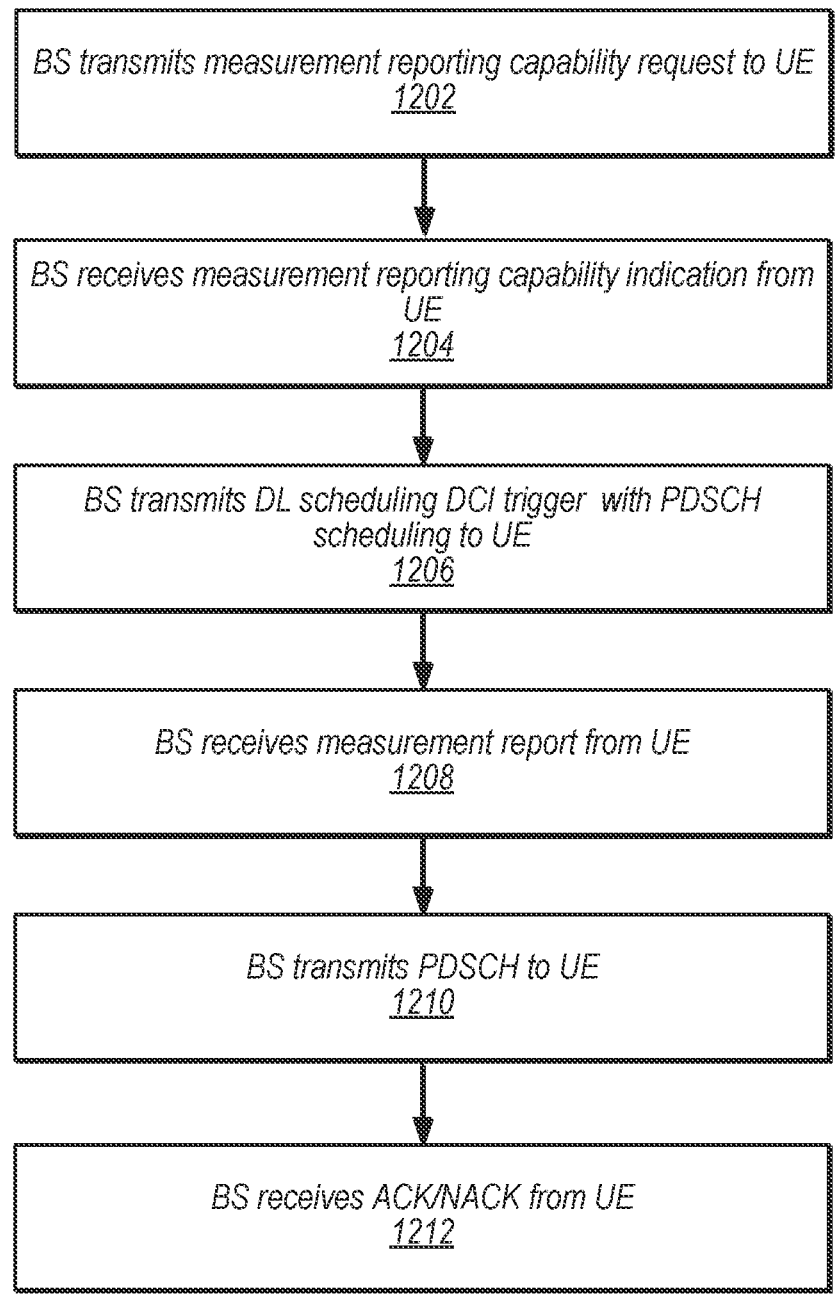
FIG. 12 is a flowchart illustrating an example method of including a measurement report as part of a clear channel assessment (CCA) procedure, according to some embodiments.

FIG. 12—Method of Including a Measurement as part of CCA Procedure

FIG. 12 illustrates exemplary techniques for performing an example method of including a measurement as part of a CCA procedure, according to some embodiments.

Aspects of the method of FIG. 12 may be implemented by a wireless device, such as the UE(s) 106, in communication with one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 402, baseband processor(s), processor(s) associated with communication circuitry, etc., among various possibilities) may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

In 1202, the base station may transmit a measurement reporting capability request to a UE. More specifically, the base station may be requesting an indication from the UE regarding the UE's capability in reporting measurements (e.g., L1-RSSI) as part of an enhanced procedure (e.g., a CCA or eCCA procedure).

In 1204, the base station may receive an indication of the UE's measurement reporting capability from the UE. More specifically, the indication may indicate to the base station whether or not the UE supports measurement reporting as part of an enhanced CCA procedure. This capability may be indicated using certain bit parameter assignments in the UE's response transmission.

In 1206, the base station may transmit downlink DCI trigger L1-RSSI along with the PDSCH scheduling. For example, the base station may transmit a physical downlink control channel (PDCCH) to the UE which may further include a CSIrequest trigger. Additionally, the PDCCH transmission may include a CSIrequest field which may be set or assigned a certain parameter in order to trigger the measurement (e.g., L1-RSSI) report. In some embodiments, the base station may utilize DCI Format 1-1 and DCI Format 1-2 with the CSIrequest field in order to indicate the measurement report trigger. Additionally or alternatively, the transmission from the base station may include DCI pertaining the scheduling of a PDSCH transmission.

In 1208, the base station may receive a measurement (e.g., a quantized L1-RSSI) via a PUSCH or PUCCH transmission from the UE. For example, the UE may indicate via the measurement report that the channel was not noisy (e.g., low interference levels). Alternatively, the UE's quantized L1-RSSI report may also indicate a noisy channel (e.g., high interference levels).

In 1210, the base station may, in response to receiving the measurement (e.g., quantized L1-RSSI), transmit a PDSCH to the UE as part of subsequent communications. For example, if the UE's measurement indicated low interference levels, the base station may proceed, due to the included DCI scheduling information included with the request trigger, with its scheduled PDSCH transmission. Alternatively, if the UE's measurement indicated a noisy channel, the base station may optionally or automatically cancel the PDSCH transmission.

In 1212, the base station may receive an acknowledgement (ACK) transmission from the UE which indicates to the base station that the UE successfully received the PDSCH transmission. Alternatively, if there was a failure in the PDSCH transmission, the base station may receive a negative acknowledgement (NACK) transmission from the UE.

FIGS. 13A-B—Explicit and Implicit Indications for Triggering Measurement Reports as part of an CCA Procedure FIG. 13A illustrates, as part of the method of including a measurement as part of a CCA procedure, an explicit indication to trigger a L1-RSSI report, according to some embodiments.

For example, in some embodiments, the base station may transmit a DL scheduling DCI trigger L1-RSSI together with PDSCH scheduling. Furthermore, as part of an explicit indication, the base station may utilize a 1-bit L1-RSSI trigger field in DCI Format 1-1 or 1-2. Accordingly, the L1-RSSI may be quantized and compared to an EDT. In some embodiments, if the L1-RSSI is above the EDT, the 1-bit L1-RSSI trigger field may be set to 0. Additionally or alternatively, if the L1-RSSI is below the EDT, the 1-bit L1-RSSI trigger may be set to 1. In some embodiments, the base station may utilize 2 or more bits with linear quantization of L1-RSSI.

In some embodiments, additional bit fields may be used to indicate the K1' value for quantized L1-RSSI transmission on PUCCH. Additionally or alternatively, K1' may be configured by radio resource control RRC signaling corresponding to each time domain resource allocation (TDRA) entry in DCI According to some embodiments, the base station (e.g., gNB) may perform scheduling of transmissions to ensure K1' is smaller than K0 in order to ensure that the base station has enough time to process L1-RSSI for DCI before PDSCH transmission at K0. In other words, it may be necessary for the base station to wait, receive, and process the L1-RSSI (corresponding to K1'). Therefore, the base station may configure K0 or K1' such that it is larger than K1' so that the PDSCH is transmitted after receiving and processing the L1-RSSI. However, in the event of K0 being less than K1', the feedback provided by the L1-RSSI may not be usable by the base station for the subsequent PDSCH transmission. Moreover, the PDSCH may be transmitted only when L1-RSSI is below the EDT, according to some embodiments. In other words, if the UE reports strong interference in the corresponding channel with the quantized L1-RSSI (which may indicate poor conditions for the base station to be transmitting through), the base station may be able to adapt accordingly and possibly cancel the PDSCH transmission "automatically". According to further embodiments, if the L1-RSSI is above the EDT, the PDSCH may be cancelled.

In some embodiments, the base station may facilitate the scheduling of transmissions such that K1' is above a threshold that the UE has reported in order for the UE to have enough time to decode the PDCCH and identify the correct Rx beam for L1-RSSI measurement.

FIG. 13B illustrates as part of the method of including a measurement (e.g., L1-RSSI) report as part of a CCA procedure, an implicit indication to trigger the L1-RSSI report, according to some embodiments.

In some embodiments, the base station may transmit a DL scheduling DCI trigger L1-RSSI together with PDSCH scheduling and may further utilize an implicit indication. For example, the base station may re-use DCI Format 1-1 and DCI Format 1-2, according to some embodiments. Additionally or alternatively, the base station may utilize RRC configuration or MAC CE signaling to enable L1-RSSI feedback for the UE. Accordingly, the UE may, in response to the signaling, send or transmit a quantized L1-RSSI corresponding to timing offset K1 from the DCI. Additionally, the K1 slot may be configured such that it is less than the following K0 timing offset. For example, as discussed above, the base station may configure K1 to be smaller than K0 in order to ensure that the base station has enough time to process L1-RSSI for DCI before PDSCH transmission at K0. In some embodiments, if the L1-RSSI is below the EDT, the base station may transmit the PDSCH and the UE may transmit an acknowledgement (ACK) after the K1 slot from the PDSCH. Additionally or alternatively, if the L1-RSSI is above the EDT, the PDSCH may be cancelled.

According to some embodiments, the UE may be configured by higher layers (e.g., RRC or MAC-CE) to perform periodic CSI reporting via PUCCH transmissions. The periodic CSI reporting may further correspond to CSI reporting settings and associated CSI resource settings which may also be configured via higher layers. In addition to including the L1-RSSI report as part of the CCA procedure, the L1-RSSI quantization may correspond to 1-bit quantization comparison to an EDT. In some embodiments, this 1-bit quantization comparison may be used to minimize the payload size of the PUCCH. Additionally or alternatively, the PUCCH resource used to report the quantized L1-RSSI may further include a PUCCH resource index configured by higher layer signaling such RRC or MAC CE signaling, according to some embodiments. Additionally or alternatively, a new field may be introduced for PUCCH resource index indication. In some embodiments, the PUCCH resource may be determined by the indicated PUCCH resource for a HARQ-ACK report. Moreover, for uplink (e.g., UCI) collision handling, the priority of L1-RSSI on PUCCH may be the same as or higher/lower than the L1-RSRP on PUCCH, according to some embodiments.

In some embodiments, the UE may perform CCA sensing to determine whether or not the medium (e.g., channel) is busy after receiving the PDCCH. The UE may be configured for 8 or 5 microsecond one-time sensing, according to some embodiments. Additionally or alternatively, the UE may be configured to perform an eCCA procedure in which it utilizes a 8 microsecond sensing event followed by 0-3 consecutive 5 microsecond slots sensing events.

In some embodiments, the quantized L1-RSSI may utilize the same HARQ ID as the PDSCH scheduling for a UCI mapping procedure. For example, the quantized L1-RSSI may be multiplexed with an ACK for another HARQ process based on the corresponding HARQ-codebook, according to some embodiments. Additionally or alternatively, the quantized L1-RSSI may be reported independently (e.g., not based on the corresponding HARQ-codebook). Accordingly, in some embodiments, it may be necessary for the UE to discard the HARQ-ACK upon detecting a collision.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
at least one processor configured to cause a base station (BS) to:
transmit, to a user equipment (UE), a measurement reporting capability request;
receive, from the UE, an indication of the UE's measurement reporting capability,
transmit, in response to receiving the indication of the UE's measurement reporting capability, signaling to the UE, wherein the signaling comprises a request trigger and downlink control information (DCI) comprising scheduling information for a subsequent transmission;
re-use one or more bits of a DCI Format 1-1 or DCI Format 1-2 field of the DCI as part of an implicit indication of the request trigger; and
receive, from the UE, a measurement report, wherein the measurement report comprises at least one received signal strength indicator (RSSI) measurement.

2. The apparatus of claim 1, wherein one or more bits of a DCI Format 1-1 or DCI Format 1-2 field of the DCI explicitly indicates the request trigger.

3. The apparatus of claim 1, wherein the RSSI measurement is reported by the UE using one or more physical uplink control channel (PUCCH) resources and quantized based on a comparison to an energy detection threshold (EDT).

4. The apparatus of claim 1, wherein the quantized L1-RSSI is reported using a hybrid automatic repeat request-identifier (HARQ-ID) associated with the scheduling information of the PDSCH signaling.

5. The apparatus of claim 1, wherein the measurement report is an aperiodic channel status information (AP CSI) report and the at least one RSSI measurement is a layer 1 (L1) RSSI measurement.

6. The apparatus of claim 1, wherein the at least one RSSI measurement is measured from one or more symbols within or across a slot.

7. The apparatus of claim 1, wherein the at least one RSSI measurement is performed in a time domain.

8. The apparatus of claim 7, wherein a measurement time of the at least one RSSI measurement in the time domain corresponds to one orthogonal frequency-division multiplexing (OFDM) symbol for a 120 kHz sub-carrier spacing (SCS), three OFDM symbols for a 480 kHz SCS, or five OFDM symbols for a 960 kHz SCS.

9. The apparatus of claim 7, wherein the at least one RSSI measurement in the time domain is performed using a receive beam associated with an active transmission configuration indicator (TCI) of the signaling.

10. The apparatus of claim 7, wherein a zero-power-channel status information-reference signal (ZP-CSI-RS) is characterized for the at least one RSSI measurement in the time domain.

11. A method, comprising:
transmitting, to a user equipment (UE), a measurement reporting capability request;
receiving, from the UE, an indication of the UE's measurement reporting capability,
transmitting, in response to receiving the indication of the UE's measurement reporting capability, signaling to the UE, wherein the signaling comprises a request trigger and downlink control information (DCI) comprising scheduling information for a subsequent transmission;
re-using one or more bits of a DCI Format 1-1 or DCI Format 1-2 field of the DCI as part of an implicit indication of the request trigger; and
receiving, from the UE, a measurement report, wherein the measurement report comprises at least one received signal strength indicator (RSSI) measurement.

12. The method of claim 11, wherein one or more bits of a DCI Format 1-1 or DCI Format 1-2 field of the DCI explicitly indicates the request trigger.

13. The method of claim 11, wherein the RSSI measurement is reported by the UE using one or more physical uplink control channel (PUCCH) resources and quantized based on a comparison to an energy detection threshold (EDT).

14. The method of claim 11, wherein the quantized L1-RSSI is reported using a hybrid automatic repeat request-identifier (HARQ-ID) associated with the scheduling information of the PDSCH signaling.

15. The method of claim 11, wherein the measurement report is an aperiodic channel status information (AP CSI) report and the at least one RSSI measurement is a layer 1 (L1) RSSI measurement.

16. The method of claim 11, wherein the at least one RSSI measurement is measured from one or more symbols within or across a slot.

17. A base station, comprising:
one or more antennas;
wireless transceiver circuitry; and
at least one processor operably coupled to the wireless transceiver circuitry and configured to cause the base station to:
transmit, to a user equipment (UE), a measurement reporting capability request;
receive, from the UE, an indication of the UE's measurement reporting capability,
transmit, in response to receiving the indication of the UE's measurement reporting capability, signaling to the UE, wherein the signaling comprises a request trigger and downlink control information (DCI) comprising scheduling information for a subsequent transmission;
re-use one or more bits of a DCI Format 1-1 or DCI Format 1-2 field of the DCI as part of an implicit indication of the request trigger; and
receive, from the UE, a measurement report, wherein the measurement report comprises at least one received signal strength indicator (RSSI) measurement.

18. The base station of claim 17, wherein the at least one RSSI measurement is performed in a time domain.

19. The base station of claim 18, wherein a measurement time of the at least one RSSI measurement in the time domain corresponds to one orthogonal frequency-division multiplexing (OFDM) symbol for a 120 kHz sub-carrier spacing (SCS), three OFDM symbols for a 480 kHz SCS, or five OFDM symbols for a 960 kHz SCS.

20. The base station of claim 18, wherein the at least one RSSI measurement in the time domain is performed using a receive beam associated with an active transmission configuration indicator (TCI) of the signaling.

* * * * *